May 27, 1930.  L. SVANCARA  1,759,965
HARROW
Filed March 26, 1929   3 Sheets-Sheet 1
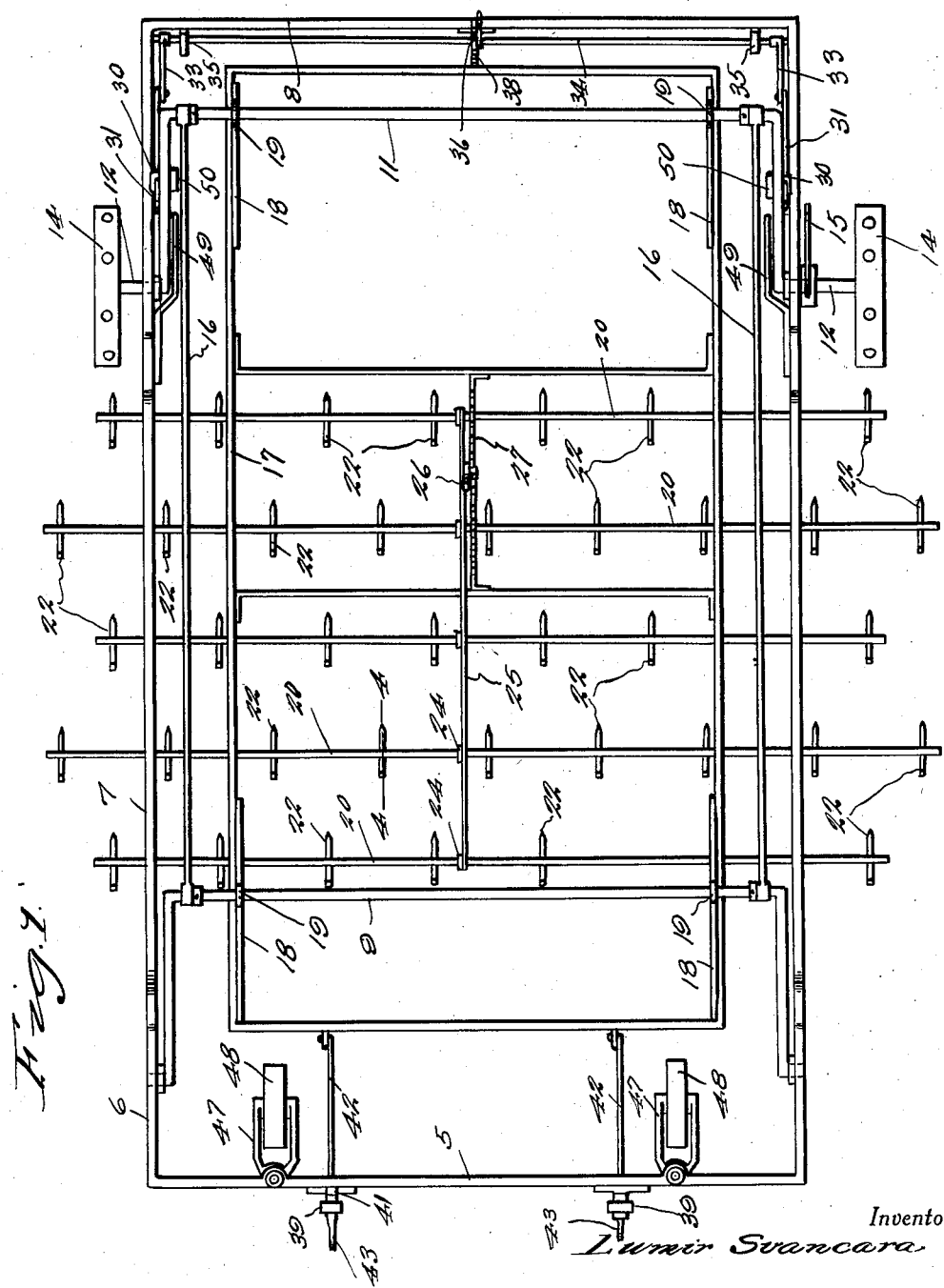
Inventor
Lumir Svancara
By Clarence A. O'Brien
Attorney

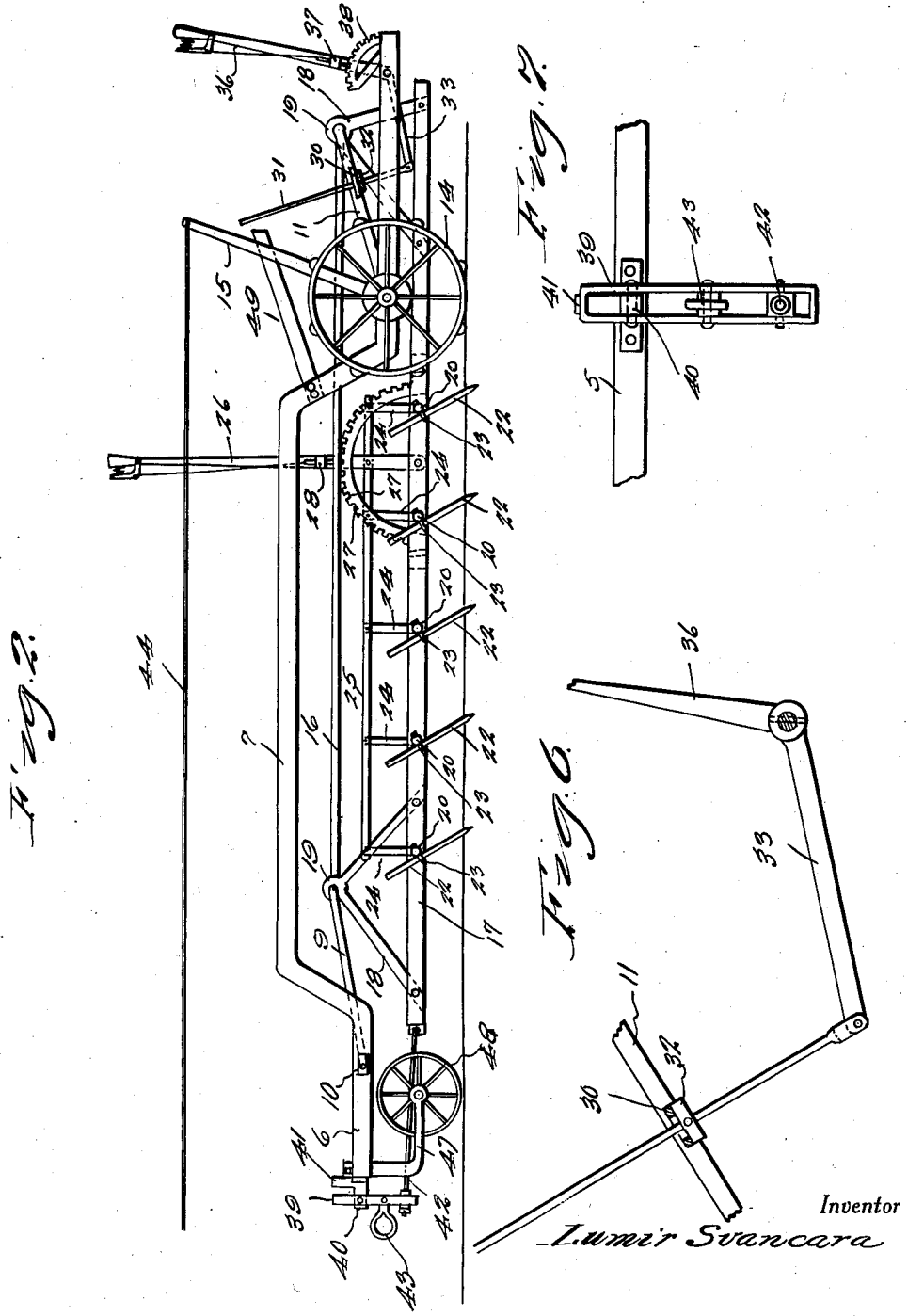

May 27, 1930. L. SVANCARA 1,759,965
HARROW
Filed March 26, 1929  3 Sheets-Sheet 3
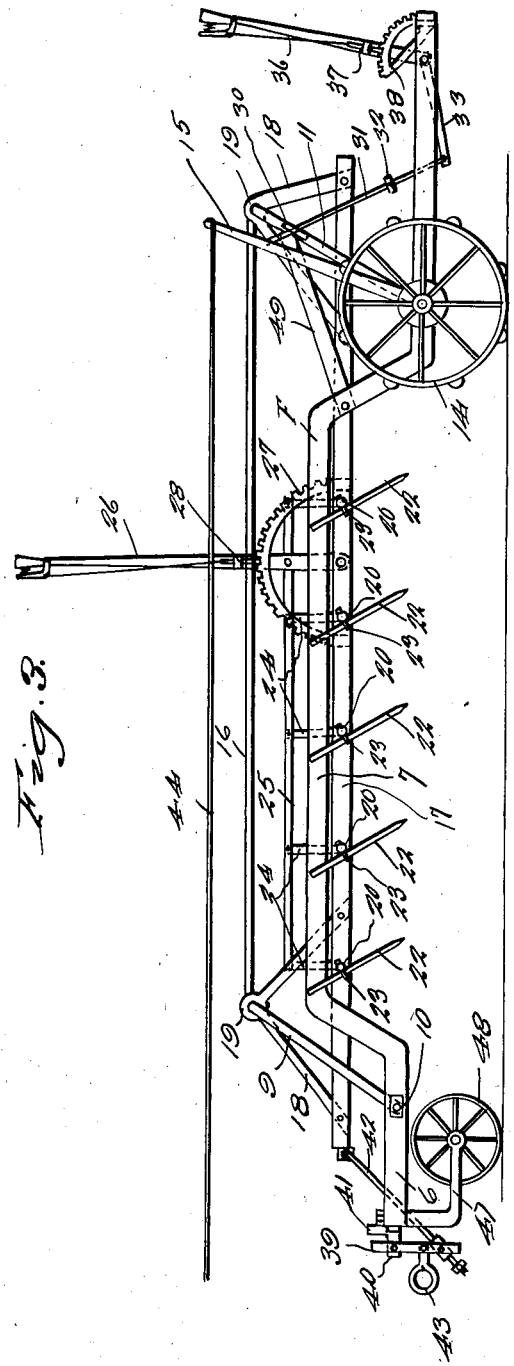
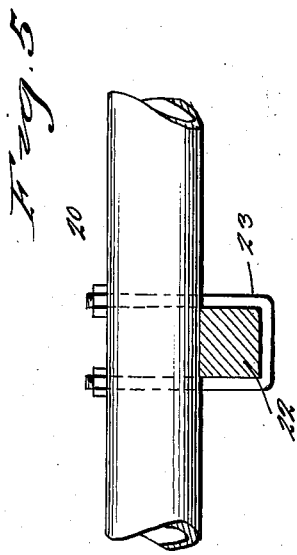
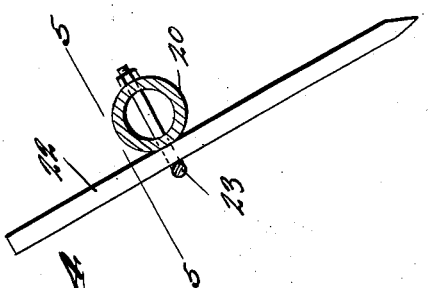
Inventor
Lumir Svancara
By Clarence A. O'Brien
Attorney Patented May 27, 1930

1,759,965

UNITED STATES PATENT OFFICE

LUMIR SVANCARA, OF BUHL, IDAHO

HARROW

Application filed March 26, 1929. Serial No. 350,036.

The present invention relates to a harrow particularly of the type adapted to be pulled along by a tractor.

The prime object of the invention resides in the provision of a tractor of this nature including a wheeled main frame and an auxiliary frame mounted therein by means whereby the auxiliary frame may be raised and lowered for disengaging and engaging the earth working elements with the ground.

Another very important object of the invention resides in the provision of a harrow of this nature which may be controlled as specified above from a remote point such as by the driver of a tractor pulling the harrow.

Another very important object of the invention resides in the provision of means to regulate the depth at which the harrow teeth will dig in the ground.

Another very important object of the invention resides in the provision of adjusting the angles of the harrow teeth.

A still further very important object of the invention resides in the provision of a harrow of this nature which is simple in its construction, inexpensive to manufacture, compact and convenient in its arrangement of parts, strong and durable, easy to manipulate, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the harrow embodying the features of my invention, Figure 2 is a side elevation thereof, Figure 3 is another side elevation thereof showing the auxiliary frame raised, Figure 4 is an enlarged detail section taken substantially on the line 4—4 of Figure 1, Figure 5 is a detail section taken substantially on the line 5—5 of Figure 4, Figure 6 is a detail view of the means for regulating the angle of the harrow teeth, and Figure 7 is a detail view of the draft frame.

Referring to the drawing in detail it will be seen that the letter F denotes generally the main frame including a front cross member 5, side bars 6 with the intermediate portion arched as is indicated at 7 and a rear cross member 8. A U-shaped member 9 has trunnions extending laterally from the ends and journaled as at 10 in the forward portions of the sides 6.

A U-shaped member 11 has outwardly extending trunnion terminals 12 forming axles for rear wheels 14. These trunnions 12 are journaled through the rear portions of the sides 6. A lever 15 is fixed to one of the trunnions 12 for rocking the member 11. The ends of the bight portions of the members 9 and 10 are connected by means of links 16.

A rectangular frame 17 which for the purposes of distinction I shall term an auxiliary frame which is provided at the ends of its side portions with upwardly extending brackets 18 having bearings 19 journaled on the bights of members 9 and 11.

Implements bars 20 are journaled through the sides of the machine to extend transversely of this harrow apparatus and harrow teeth 21 are attached thereto by means of U-bolts 23 as is clearly indicated in Figures 4 and 5.

The implement bars 20 are provided with rising cranks 24 connected with a link 25 which is pivotally connected to an intermediate portion of a lever 26 journaled in a rack bracket 27 and the lever is provided with a detent structure 28 for association with the rack bracket. Obviously by rocking the lever 26 the bars 20 may be rocked to adjust the angles of the teeth in respect to the ground as may be desired.

The legs of the member 11 are formed with eyes 30 through which are slidable rods 31 having stops 32 fixed thereto. These rods 31 are pivotally engaged with the crank 33 extending from the shaft 34 journaled in bearings 35 projecting forwardly from the cross member 8.

A lever 36 is fixed to the shaft 35 and has a detent structure 37 cooperable with a rack bracket or quadrant 38 mounted on the member 8. The stop collars 31 limit the downward movement of the member 11 therefore controls the maximum digging depth of the harrow teeth and obviously this depth may be regulated by rocking the lever 36 as will be quite apparent.

Rectangular draft frames 39 have intermediate portions adjacent their upper ends pivoted on forwardly projecting bracket 40 on the member 5, these brackets having upstanding portions 41.

Draw rods 42 are connected with the lower portions of the draft frames 39 and with the forward end of the frame 17. Clevises 43 are engaged between the brackets 40 and the rods 42 in the frames 39 so that suitable draft means such as a tractor or the like may be hitched thereto. A cable 44 is engaged with the upper end of the lever 15.

After the lever 36 has been adjusted to allow the teeth 21 to dig the desired depth and the tractor is pulling the apparatus along it will be seen that should an obstacle be encountered the cable 40 may be pulled from the remote point such as the driver's seat of the tractor so as to lift the auxiliary frame and clear the obstacle or the like.

In this connection it will be seen that yokes 47 are pivotally engaged with the member 5 and have wheels 48 mounted therein.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed.

In the present embodiment of the invention it is preferable to provide stock arms 49 projecting from the rear ends of the arched intermediate portions 7 of the frame F with which projections 50 on the legs of member 11 may engage when the auxiliary frame is raised at which time the legs of the members 9 and 11 will be inclined upwardly and rearwardly as is indicated in Figure 3 so that as soon as the cable is released the auxiliary frame swings downwardly by gravitation into its proper ground engaging position.

Having thus described my invention, what I claim as new is:

1. In a harrow structure of the class described, a wheeled frame, a front U-shaped member having trunnion ends journaled in the main frame, U-shaped rear member having trunnion terminals journaled through the rear portion of the main frame and extending outwardly thereof, wheels journaled on the last mentioned trunnion terminals, links connecting the bight portions of the U-shaped members, an auxiliary frame, brackets rising from the auxiliary frame and journaled on the bight portions of the member, and cultivating means carried by the auxiliary frame, a crank lever fixed to one of the last mentioned trunnion terminals to swing the member for raising and lowering the auxiliary frame, ears extending from the lengths of the rear U-shaped member, rods having stops thereon extending through the ears, and means for adjusting the rods to limit the downward movement of the rear member thereby controlling the digging depth of the cultivating machine.

2. In a harrow structure of the class described, a wheeled frame, a front U-shaped member having trunnion ends journaled in the main frame, U-shaped rear member having trunnion terminals journaled through the rear portion of the main frame and extending outwardly thereof, wheels journaled on the last mentioned trunnion terminals, links connecting the bight portions of the U-shaped members, an auxiliary frame, brackets rising from the auxiliary frame and journaled on the bight portions of the member, and cultivating means carried by the auxiliary frame, a crank lever fixed to one of the last mentioned trunnion terminals to swing the member for raising and lowering the auxiliary frame, ears extending from the lengths of the rear U-shaped member, rods having stops thereon extending through the ears, and means for adjusting the rods to limit the downward movement of the rear member thereby controlling the digging depth of the cultivating machine, means for limiting the upward swinging movement of said rear U-shaped member.

3. In a harrow structure of the class described, a wheeled frame, a front U-shaped member having trunnion ends journaled in the main frame, U-shaped rear member having trunnion terminals journaled through the rear portion of the main frame and extending outwardly thereof, wheels journaled on the last mentioned trunnion terminals, links connecting the bight portions of the U-shaped members, an auxiliary frame, brackets rising from the auxiliary frame and journaled on the bight portions of the member, and cultivating means carried by the auxiliary frame, a crank lever fixed to one of the last mentioned trunnion terminals to swing the member for raising and lowering the auxiliary frame, ears extending from the lengths of the rear U-shaped member, rods having stops thereon extending through the ears, and means for adjusting the rods to limit the downward movement of the rear member thereby controlling the digging depth of the cultivating machine, means for limiting the upward swinging movement of said rear U-shaped member, said cultivating means comprising a plurality of bars journaled transversely across the auxiliary frame, means engaged therewith, cranks projecting from the bars, a link connected with said cranks, and means for shifting the link to rock the bar and vary the angles of the teeth.

In testimony whereof I affix my signature.

LUMIR SVANCARA.